Feb. 14, 1967   C. A. SHERMAN   3,303,831
VARIABLE COMPRESSION RATIO PISTON AND VALVE
Filed Sept. 2, 1964   2 Sheets-Sheet 1

INVENTOR.
CLARENCE A. SHERMAN
BY
Barnes, Kisselle, Raisch & Choate
ATTORNEYS

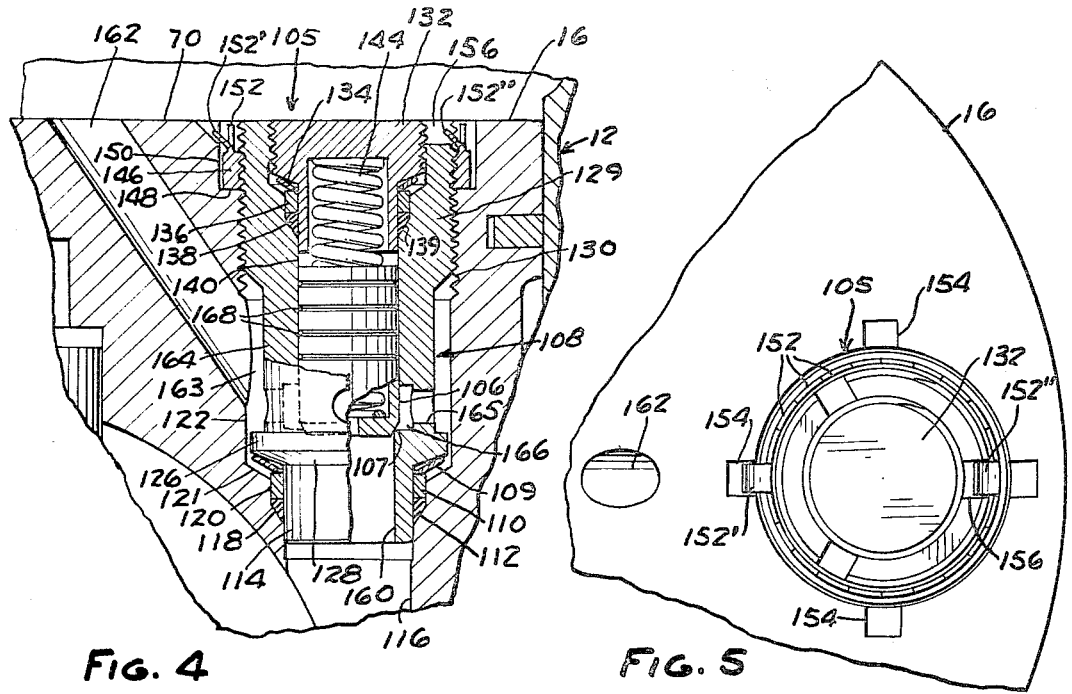
FIG. 4
FIG. 5
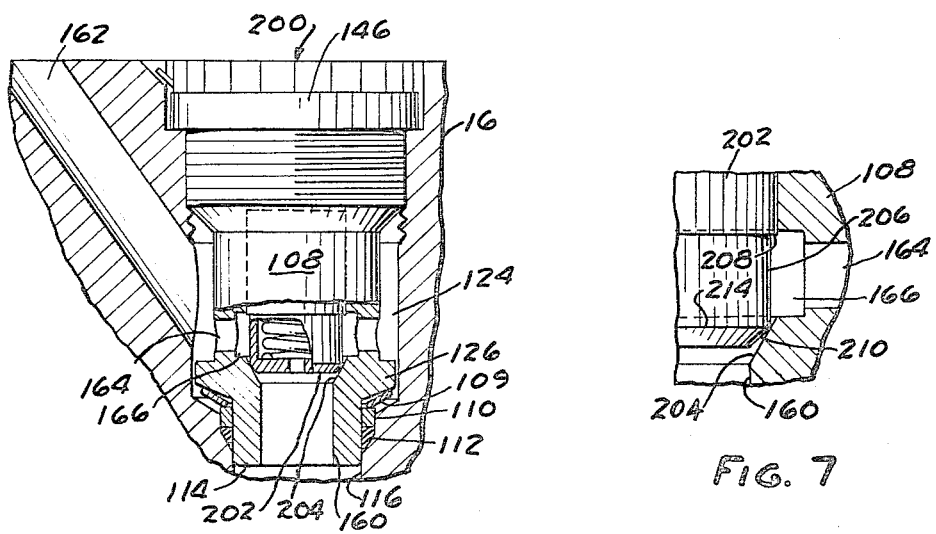
FIG. 6
FIG. 7
INVENTOR.
CLARENCE A. SHERMAN

United States Patent Office 3,303,831
Patented Feb. 14, 1967

3,303,831
VARIABLE COMPRESSION RATIO PISTON
AND VALVE
Clarence A. Sherman, 31303 Churchill,
Birmingham, Mich. 48009
Filed Sept. 2, 1964, Ser. No. 393,916
1 Claim. (Cl. 123—48)

This invention relates to improvements in pressure regulating valves and pistons, and more particularly to an improved valve for a reciprocating piston of the variable compression ratio (VCR) type as disclosed in U.S. Patents Nos. 2,742,027, 3,014,468 and 3,038,458.

An object of the present invention is to provide an improved VCR piston which is operable to regulate maximum combustion chamber pressure in a uniform manner regardless of engine speed.

Another object is to provide an improved pressure regulating discharge valve for a VCR piston which is speed compensated by dynamic forces acting directly on the valve to thereby regulate hydraulic control of the piston in a manner which insures uniform maintenance of the maximum desired combustion chamber pressure by the piston regardless of engine speed.

A further object is to provide an improved VCR piston and regulating valve construction wherein the mass of the valve and regulating spring therefor are minimized and the operating speed of the valve is increased.

Other objects, features and advantages of the present invention will become apparent in the following description taken in conjunction with the accompanying drawings wherein:

FIG. 4 is an enlarged fragmentary view taken in vertical section through a modified form of the pressure regulating valve and VCR piston of the present invention.

FIG. 5 is a fragmentary plan view of the valve and piston as shown in FIG. 4.

FIG. 6 is an enlarged fragmentary view taken partially in vertical section through a second modification of the pressure regulating valve of the present invention.

FIG. 7 is a fragmentary enlarged view of a portion of FIG. 6 illustrating the valve seating and differential working areas of the valve of FIG. 6.

Figure 1:
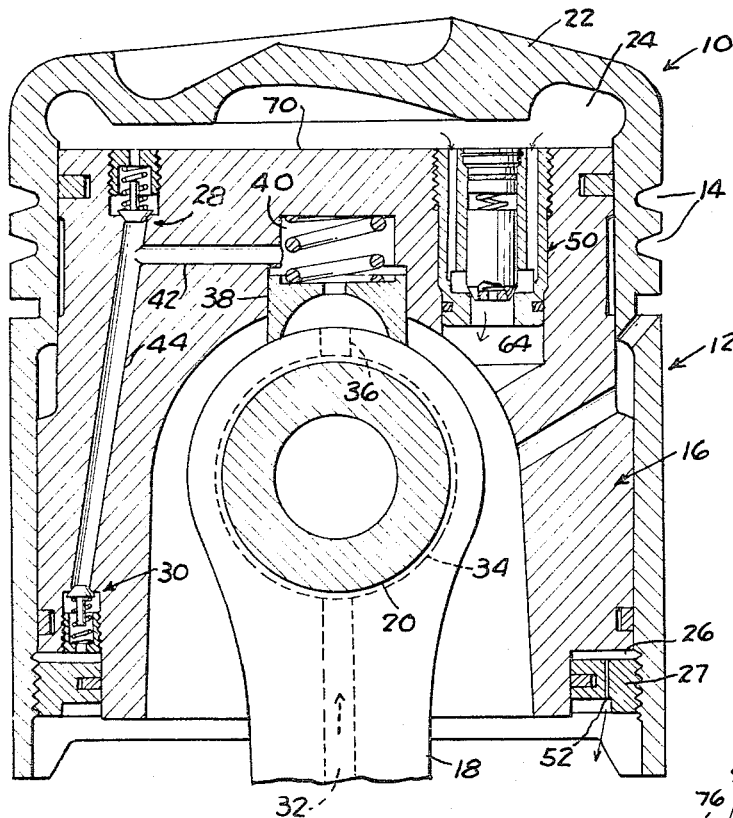
FIG. 1 is a vertical section through the axis of an improved VCR piston constructed in accordance with the present invention.

Referring to FIG. 1, there is shown by way of example a VCR piston 10 adapted for reciprocation in the bore of a cylinder of a four-stroke cycle internal combustion engine. The automatic, hydraulically-actuated VCR piston illustrated in FIG. 1 consists of two main parts: the piston shell 12 (outer member) grooved at 14 to carry piston rings, and the piston pin carrier 16 (inner member). Carrier 16 is linked to the crank shaft of the engine by a connecting rod 18 and piston pin 20 and always moves between fixed upper and lower limits, whereas shell 12 is free to move within certain limits relative to carrier 16. The relative movement provides a variable height from the center of the piston pin to the top of the piston crown 22, thus effecting a variation in compression ratio through a change in the clearance volume in the cylinder of the engine without any change in engine displacement.

The movement of piston shell 12 is restrained hydraulically by oil contained within an upper chamber 24 formed between crown 22 and the top of carrier 16, and by the oil contained within an annular lower chamber 26 formed between carrier 16 and a ring 27 carried by shell 12. The relative position of shell 12 and carrier 16 with respect to each other is determined by the control of the quantity of oil in, and thus the volumes of, the upper and lower chambers 24 and 26.

Chambers 24 and 26 are filled with lubricating oil supplied through the non-return inlet check valves 28 and 30. Oil from the lubricating system of the engine is fed to valves 28 and 30 via a series of interconnecting passages comprising a passage 32 in rod 18, a groove 34 encircling pin 20, an outlet 36 in the top of rod 18, a spring-loaded slipper collector 38, a spring chamber 40 and passages 42 and 44 in carrier 16. Oil is discharged from the upper chamber 24 when it exceeds a predetermined pressure therein by means of a preset spring-loaded relief valve 50 provided in accordance with the present invention and described in more detail hereinafter. During compression and firing, relief valve 50 limits the maximum allowable pressure in chamber 24 which in turn assures that the engine peak firing pressure does not exceed a corresponding predetermined maximum pressure. The relationship between the pressures in chamber 24 and in the combustion chamber depends upon the respective areas exposed to these pressures.

Oil may be controllably discharged from the lower chamber 26 via a fixed orifice 52 in ring 27 to thereby control the amount of relative movement between shell 12 and carrier 16 on the exhaust and intake strokes. Oil discharged from orifice 52 and relief valve 50 returns directly to the crankcase as indicated by the arrows associated therewith. It is to be understood that as oil is bled from orifice 52 to thereby permit a decrease in the volume of lower chamber 26, the volume of upper chamber 24 increases and is filled with oil through inlet valve 28. Conversely, when oil is bled from relief valve 50 to permit a decrease in the volume of upper chamber 24, the volume of the lower chamber 26 increases and is filled with oil through inlet valve 30.

The general operation of the VCR piston 10 as described thus far is as follows:

During the latter part of each upward stroke of the piston and the early part of each downward stroke, the inertia of the oil in the connecting rod passage 32, acting upward, creates a pressure in the passages 42, 44. This pressure tends to open the inlet valves 28 and 30 and pump oil into the upper and lower chambers 24 and 26. At the same time the inertia of the piston shell 12, also acting upwardly, tends to raise the shell relative to carrier 16. During the compression and power strokes this tendency is less than the tendency for opposite motion caused by the gas pressure acting on the piston crown 22, but during the exhaust and induction strokes the inertial forces predominate. Consequently, during the latter part of each exhaust stroke and the early part of each induction stroke, shell 12 moves upwardly relative to carrier 16, and as a result oil enters upper chamber 24 via valve 28. Simultaneously, lower chamber 26 diminishes in volume and oil is therefore forced out of it via orifice 52. Lower chamber 26 thus functions as a dash pot and restrains the tendency of shell 12 to seek the upper limit of its travel. Orifice 52 is sized to insure that shell 12 will not move upward relative to the carrier 16 more than a small amount on each exhaust stroke.

During the compression and power strokes, the gas pressure acting on piston crown 22 is transmitted to carrier 16 through the oil in upper chamber 24, creating a high oil pressure in this chamber. Whenever the gas pressure exceeds the selected upper limit, sufficient oil pressure is built up in upper chamber 24 to open the discharge valve 50 and release some of the oil, allowing shell 12 to move downwardly relative to carrier 16, thus decreasing the compression ratio of the engine. The downward relative movement of shell 12 enlarges lower chamber 26 at a time when the oil pressure in the passages 32-44 is high. Consequently, valve 30 opens and oil enters the lower chamber to keep it fully charged.

The amount of oil discharged from the upper chamber in any single compression-power stroke depends upon the margin by which the cylinder gas pressure exceeds that necessary to cause the discharge valve 50 to open and the duration of this excess pressure. The valve setting and the magnitude of duration of the excess gas pressure determine the downward movement of shell 12 relative to carrier 16. The upward relative movement, on the other hand, is the same on each exhaust-induction stroke, being determined by the size of the fixed orifice 52. If the upward and downward relative movements are equal, as is the case when the engine is running under a constant load, the effective compression ratio will remain unchanged. If the load is increased, the downward movements will exceed the upward movements, lowering the compression ratio until an equilibrium has been established. Conversely, if the load is reduced, the compression ratio will be increased to a new point of equilibrium.

The above described operation assumes that the VCR piston 10 is reciprocating at a constant speed. However, it has been found that when a conventional spring loaded pressure regulating valve is used to control pressure in chamber 24, combustion chamber pressure tends to creep above the desired maximum as the speed of the piston increases. This is believed to be due in part to the increased importance of certain effects on the operation of the pressure regulating discharge valve in the upper ranges of engine speed. Since it is desired to provide instantaneous control of the upper chamber oil pressure, valve inertia causes it to become sensitive to the rate of combustion pressure rise in the main chamber, as well as to the rate of the spring which provides the preload on the valve. Also, there are certain speed effects which cause the piston to regulate combustion chamber pressure at pressures higher than the desired maximum pressure in the upper range of engine speed. All of these forces, except the oil pressure in the lower chamber, tend to increase the regulated gas pressure as the piston speed increases. The present invention overcomes this problem by providing an improved speed compensated relief valve 50 in a novel arrangement in piston 10 which enables the piston to maintain substantially uniform combustion chamber pressure regardless of engine speed.

Figure 2:
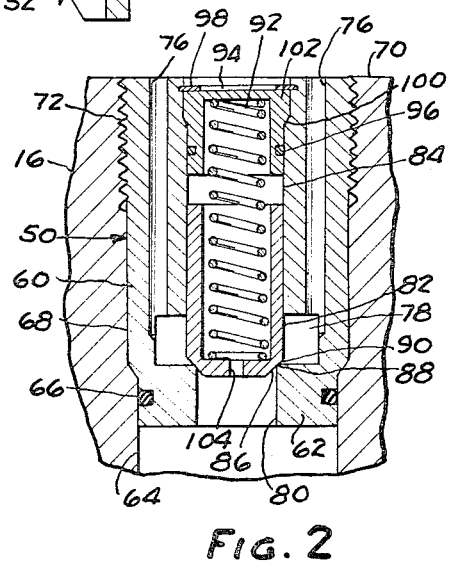
FIG. 2 is an enlarged sectional view of one embodiment of the pressure regulating discharge valve of the invention as shown in FIG. 1.

As shown in the enlarged view of FIG. 2, valve 50 is a self-contained unit enclosed in a valve casing 60. Casing 60 is reduced in diameter at its lower end 62 to fit closely within a bore 64 oriented in carrier 16 with its axis parallel to the axis of piston 10. Bore 64 is open at its lower end for draining oil discharged from valve 50 to the engine crankcase. The upper end of bore 64 opens into a larger diameter coaxial bore 68 which extends to the upper surface 70 of carrier 16. Bore 68 is threaded at its upper end to threadably receive the threaded portion 72 of casing 60.

Figure 3:
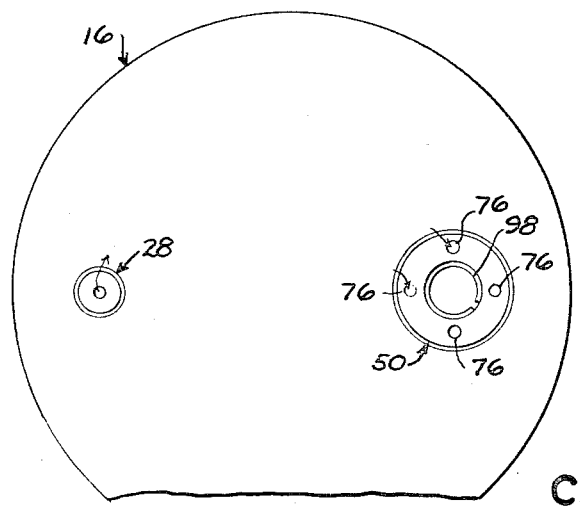
FIG. 3 is a fragmentary plan view of the inner piston or carrier element of the VCR piston.

Casing 60 has four discharge passages 76 (FIG. 3) extending from the upper end of casing 60 downwardly parallel to the axis of the casing to an annular chamber 78 formed within casing 60. Communication between chamber 78 and a central discharge passage 80 of the casing is controlled by a valve member 82 of the barrel-poppet type. Valve member 82 is slidably mounted in a bore 84 coaxial with bores 80 and 64 so that the direction of opening and closing movement of valve member 82 is parallel to the direction of piston travel. The lower end of valve member 82 has a frusto-conical surface 86 adapted to seal against a right angle internal annular shoulder 88 formed in casing 60 at the junction of bore 80 and chamber 78. When valve member 82 is seated as shown in FIG. 2, a small portion 90 of surface 86 is exposed to the fluid in chamber 78 to provide a working surface for developing a force acting upwardly on valve member 82 tending to unseat the valve. A compression coil spring 92 is disposed within the hollow interior of valve member 82 and extends upwardly therefrom into a spring retainer cup 94 partially inserted into bore 84 and sealed therein by an O-ring 96. Cup 94 is fixed against downward movement by a shoulder 100 abutting the enlarged head portion 102 of cup 94, and is fixed against upward movement by a snap ring 98 (FIGS. 2 and 3). The lower end of valve member 82 has a hole 104 for venting fluid pressure in the spring chamber to the downstream side of the valve.

In operation, valve 50 functions as a speed compensated pressure regulating valve for controlling the maximum pressure of the oil in the upper chamber 24 of piston 10. Due to the orientation of valve member 82 such that it moves in a direction parallel to the travel of piston 10, and due to valve closing movement being in a downward direction, e.g., away from the cylinder combustion chamber, the valve closing force exerted by spring 92 is opposite to the inertial forces acting on valve member 82 as the piston 10 decelerates in approaching top dead center and then accelerates in the opposite direction after passing top dead center. This inertial loading on valve member 82 increases in proportion to the square of engine r.p.m. and acts as an opening force on valve member 82 which varies with engine r.p.m., increasing at higher speeds and decreasing at lower speeds, and which also varies with the cyclical variation in the position of piston 10. The latter variation occurs at double the frequency of, but substantially in phase with, the cyclical variation in combustion chamber pressure, the inertial force and combustion chamber pressure both reaching their maximum when piston 10 is in the vicinity of top dead center.

Since the inertial force opposes the valve closing force of the spring 92, the force required to open valve member 82 is reduced as engine r.p.m. increases. This in turn causes valve member 82 to be opened by the oil under pressure in chamber 78 at a lower pressure at high speeds than at low speeds. This enables valve member 82 to discharge the required volume of oil from chamber 24 for balancing a unit increase in combustion chamber pressure regardless of piston speed. Also, since inertial forces act parallel to the direction of valve movement, these forces do not affect the frictional engagement of valve member 82 with the wall of bore 84. Thus, by providing the aforementioned orientation and closing direction of valve member 82 relative to piston travel and the combustion chamber respectively, the desired maximum combustion chamber pressure will be maintained by piston 10 at a substantially uniform value.

A further feature of the improved valve 50 of the present invention resides in the small area 90 exposed to the pressure of oil in chamber 78 when valve member 82 is closed against seat 88. By thus exposing only a small area of working surface 86, the unseating force acting on valve member 82 for any given oil pressure is reduced. This in turn permits the use of a weaker and lighter weight spring 92 for maintaining a given valve relief or discharge pressure. Since the stress on valve member 82 in the closed condition is also reduced, less material is required in valve member 82, thereby permitting a reduction in the mass of the valve member. The mass required in valve member 82 to develop the desired inertial speed compensating force is less than that needed for strength, and therefore the use of a weaker spring 92 permits the valve mass to be reduced to correspond to the lowered stress. This is beneficial from the standpoint of valve operation as well as cost and total piston weight inasmuch as both spring 92 and valve member 82 should be as lightweight as possible to prevent over-compensation resulting from the inertial loading, which increases with the square of engine speed and hence becomes very large at high speeds.

A further feature of valve 50 is the greatly increased working area 86, which, upon valve member 82 being unseated is exposed to the pressure of oil discharged from chamber 78 to the discharge passage 80 via the annular space between surface 86 and seat 88. This causes a sudden increase in the valve opening force, resulting in a snap opening action which is beneficial in obtaining instantaneous control of oil pressure in chamber 24. In addition, the additional working area causes the valve to be held open and at a greater distance from the valve seat by less oil pressure than that required to initially unseat the valve. This in turn produces a higher discharge rate even though the pressure starts dropping immediately after the valve is cracked off its seat. The additional working area also permits the use of a higher rate, and hence shorter length, spring 92.

Referring to FIGS. 4 and 5, a modified speed compensated pressure regulating discharge valve 105 of the present invention is shown installed in carrier 16 which in turn is modified as described hereinafter to adapt it to valve 105. Valve 105 contains a valve member 106 which is urged against a seat 107 in the valve casing 108 of valve 105. Valve 105 is oriented relative to travel of piston 10 and flow of oil from chamber 24 in the same manner as valve 50, and is speed compensated due to inertial loading on the valve in like manner. The principal differences between valve 105 and valve 50 are in the construction of the seals employed in the valve, the valve retention structure and the oil conducting passages to the valve member 106.

Considering first the improved seal arrangement of valve 105, it will be noted that in lieu of O-rings a composite seal assembly is provided which, at the lower end of the valve 105, comprises a spring washer 109, a steel ring 110 and a solid Teflon ring seal 112. These elements encircle the reduced diameter lower end 114 of casing 108, which has a close tolerance fit in a bore 116 formed in the carrier 16 parallel to the axis of piston 10. Bore 116 is a stepped bore having an outwardly flaring shoulder 118 merging with a constant diameter portion 120 having another tapered shoulder 121 which in turn merges with a counterbore 122. Seal 112 has a tapering outer periphery complementary to shoulder 118 and seats thereagainst. Ring 110 is disposed in bore portion 120 and serves as a back-up ring for seal 112. Casing 108 has a flange 126 with a chamfered surface 128 which bears against the upper edge of spring washer 109, the lower edge of washer 109 bearing against ring 110. Washer 109 is compressed between flange 126 and ring 110 during assembly of valve 105 in carrier 16, e.g. when the enlarged threaded upper end 129 of casing 108 is screwed into threads 130 of bore 122. This produces an axial force on seal 112 which urges it downwardly against shoulder 118 which in turn wedges seal 112 tightly against the lower end 114 of the valve casing.

Another composite seal, similar to composite seals 109, 110 and 112, is provided between a modified spring retainer cup 132 and the valve casing 108 and comprises a spring washer 134, a steel ring 136 and a Teflon ring seal 138 is wedged by a tapered shoulder 139 tightly against the exterior of cup 132 to seal the clearance space between it and the central bore 140 in which valve member 106 slides. Cup 132 is threadably retained in the upper end 129 of casing 108 and receives the upper end of a pressure regulating spring 144.

Valve casing 108 is held positively against rotation by a lock nut 146 which is screwed down onto the threads of casing end 129 until it bottoms on a shoulder 148 formed between bore 122 and a counterbore 150. Lock nut 146 has a plurality of upright tabs 152, one of which indicated 152' is bent radially outwardly into a notch 154 formed in carrier 16 (FIGS. 4 and 5). Another of the tabs 152 indicated 152" is bent radially inwardly into a notch 156 formed in the upper end of the casing 108.

Valve 105 also differs from valve 50 in that oil from piston chamber 24 is not directed through the valve casing but rather communicates with the discharge passage 160 in casing 108 via a slanted passage 162 formed in shell 16 which opens at its lower end to an annular chamber 163 formed between counterbore 122 and a reduced diameter portion 164 of casing 108. Chamber 163 in turn communicates via radial ports 165 in casing 108 which lead inwardly to an annular chamber 166 surrounding the lower end of valve member 106 above seat 107. Composite seal 109, 110, 112 prevents leakage of oil from chamber 163 via the exterior of casing 108 while accommodating differential expansion movements between casing 108 and carrier 16.

The above seal structure of the modified valve 105, due to the use of polytetrafluoroethylene material in seal 112, is more resistant to high temperatures than the rubber O-ring seals of valve 50, and the lock nut 146 provides more secure retention of valve 105 in carrier 16. In addition to the above features, the valve member 106 of valve 105 has a series of annular pressure grooves 168 formed therein which function to distribute oil circumferentially around valve member 106 to prevent it from binding against the side of bore 140.

FIGS. 6 and 7 show a further modified pressure regulating discharge valve 200 of the present invention which is the same as valve 105 except that valve 200 has a modified valve member 202 and valve seat 204. As best seen in FIG. 7, the lower end of valve member 202 is reduced in diameter to form a constant diameter portion 206 which terminates at its upper end at a shoulder having a radial face 208 which is always exposed to the oil in chamber 166. The lower end of portion 206 terminates at a chamfer 210 which is inclined at a slightly greater angle from the vertical than the conical valve seat 204 formed in the upper end of discharge passage 160. When the lower edge 214 of portion 206 engages valve seat 204, face 208 is the only upwardly acting working area exposed to oil under pressure in chamber 166. When valve 202 is unseated, area 208 is augmented by all of chamfer 210 which thereupon becomes exposed to oil discharging from chamber 166 into passage 160 to increase the valve opening force in the snap-acting manner of valve member 82. The configuration of valve 200 is preferred for ease of manufacture since it permits closer tolerance control of the working area 208. This area is preferably formed as a result of a grinding operation wherein metal is removed from valve member 202 to produce the reduced constant diameter portion 206.

From the foregoing description, it will now be apparent that the improved speed compensated VCR piston and valve structure of the present invention fulfills the objects stated herein in a simple and economical manner to provide improved performance and more uniform regulation of combustion chamber pressure.

I claim:

In an internal combustion engine piston having first and second parts movable relative to one another in response to reciprocation of the piston with respect to a combustion chamber of an engine and having a pressure fluid chamber within said piston which varies in internal volume in response to said relative movement and to variations in the quantity of pressure fluid therein, the combination therewith of means forming a fluid flow passage communicating with said chamber, a valve member carried by said piston movable to open and close said passage for controlling flow of fluid therethrough to thereby vary the quantity of fluid in said chamber, means for yieldably biasing said valve member toward closed position to thereby regulate the pressure of the fluid in said chamber, said valve member being oriented for movement parallel to the direction of reciprocation of said piston and being adapted to close in a direction opposite to the inertial forces acting on said valve member when said piston decelerates in approaching the combustion chamber, a casing for slidably supporting said valve member and having a valve seat engaged by one end of said valve member to close said passage, said passage means including a chamber in said casing adjacent said valve seat communicating with said first chamber, said valve member having a first working area of predetermined size exposed to the oil pressure in said casing chamber in both the open and closed positions of said valve member whereby the oil pressure tends to develop an unseating force on said valve, said valve member having a second working area exposed to oil only when said valve is unseated and adapted to augment said first area and increase the opening force exerted by the oil when said valve is unseated by the oil pressure, said valve seat comprising a conical surface of said casing, said one end of said valve member having a surface defining said second working area and being inclined at a greater angle to the axis of said valve member than said valve seat surface, said valve member further having a stepped shank comprising a constant diameter portion extending from an edge of said second working area surface of said valve member, a larger diameter portion slidably engaging said casing and a shoulder intermediate said portions having a radial face providing said first working area, said valve member seatably contacting said valve seat surface along said edge of said second surface of said valve member.

References Cited by the Examiner

UNITED STATES PATENTS

| | | | |
|---|---|---|---|
| 2,247,032 | 6/1941 | Norton | 285—166 |
| 2,553,340 | 5/1951 | Smith | 285—347 |
| 2,642,088 | 6/1953 | Kirkham | 137—538 X |
| 2,742,027 | 4/1956 | Mansfield | 123—78 |
| 2,775,471 | 12/1956 | Douglass | 285—347 |
| 3,014,468 | 12/1961 | Mansfield | 123—48 |
| 3,038,458 | 6/1962 | Mansfield | 123—78 |
| 3,068,894 | 12/1962 | Bunting et al. | 137—538 X |
| 3,156,162 | 11/1964 | Wallace et al. | 92—82 |
| 3,205,878 | 9/1965 | Timour et al. | 123—48 |
| 3,215,457 | 11/1965 | Teeters | 285—341 |

MARK NEWMAN, *Primary Examiner.*

WENDELL E. BURNS, *Examiner.*